United States Patent
Palzkill

(10) Patent No.: US 10,123,519 B2
(45) Date of Patent: Nov. 13, 2018

(54) TORSION SPRING FISH HOOK

(71) Applicant: Steven Joseph Palzkill, Gordon, WI (US)

(72) Inventor: Steven Joseph Palzkill, Gordon, WI (US)

( * ) Notice: Subject to any disclaimer, the term of this patent is extended or adjusted under 35 U.S.C. 154(b) by 264 days.

(21) Appl. No.: 14/921,975

(22) Filed: Oct. 23, 2015

(65) Prior Publication Data
US 2017/0112112 A1    Apr. 27, 2017

(51) Int. Cl.
*A01K 83/02*    (2006.01)
(52) U.S. Cl.
CPC ..................... *A01K 83/02* (2013.01)
(58) Field of Classification Search
CPC ...................................................... A01K 83/02
See application file for complete search history.

(56) References Cited

U.S. PATENT DOCUMENTS

| | | | | |
|---|---|---|---|---|
| 3,175,322 A * | 3/1965 | Snyder | ............... | A01K 83/02 43/36 |
| 3,492,752 A * | 2/1970 | Viveiros | ............... | A01K 83/02 43/36 |
| 3,986,289 A * | 10/1976 | Zimmerman | ............. | A01K 83/02 43/36 |
| 4,104,820 A * | 8/1978 | Bardebes | ............... | A01K 83/02 43/36 |
| 4,476,646 A * | 10/1984 | Weiman | ................. | A01K 83/02 43/34 |
| 5,009,026 A * | 4/1991 | Corbitt, III | ............ | A01K 83/06 43/44.2 |
| 6,497,068 B1 * | 12/2002 | Lemons | ................. | A01K 83/02 43/36 |
| 8,020,337 B1 * | 9/2011 | Batton | ................... | A01K 83/02 43/36 |
| 2004/0134118 A1 * | 7/2004 | Miller | .................... | A01K 83/02 43/34 |

* cited by examiner

Primary Examiner — Christopher R Harmon

(57) ABSTRACT

A fishing hook assembly that is either self-setting or initiated upon the fisherman setting the hook. A torsion spring placed at the head of the assembly which is interconnected by two shafts that are terminated by hooks. The hooks used on the first shaft termination can consist of a single hook, treble hook, or jig hook. The first shaft also consists of a latch placed at the end of the selected hook before the hook bend. The shafts are bent outward at 15 to 30 degrees at the torsion spring to allow closer proximity when compressed.
The second shaft terminates with a single hook element and is the shaft where the release element is slide onto the shaft adjacent to the latch. The release element has a connection point where the fishing line is directly connected to the release element. The torsion spring is compressed bringing the first and second shafts together with the release element on the second shaft slide onto the latch located at the hook bend on the first shaft. The fishing assembly is engaged by the fish striking the assembly or by the fisherman setting the hook which slides the release element forward off the latch which expands the assembly.

3 Claims, 1 Drawing Sheet

TORSION SPRING FISH HOOK

CROSS REFERENCE TO RELATED APPLICATION

This application is claiming the benefit of U.S. Provisional Application No. 62/122,773 filed on Oct. 29, 2014, titled "Spring hook". This patent application is cross-referenced in its entirety to provide continuation in patent applications.

BACKGROUND OF THE INVENTION

1. Field of the Invention

The invention consists of a self-setting hook apparatus used to catch fish. The assembly applies the basic premise of a hook while being enhanced with a torsion spring and two shafts that when engaged expands the hooking gap and increases efficiency.

Traditional fishing hooks have a set gap of a proportional size to fish species being targeted. Too large of a fish hook will not be effective for smaller fish species. Additionally, traditional fishing hooks have the problem of having the fish species engulf the hook which aids in catching the fish species but increases mortality when practicing catch and release. Catch and release practices of leaving the traditional hook in the fish species often still results in mortality of the fish species and can result in predator mammals and birds scavenging the dead fish species. This can result in the less morality of these scavengers. The invention has outward bent shafts which allow for smaller profile when compressed and expands to a larger hook gap when engaged. The profile of the invention when tested has very high occurrences of not allowing the fish to engulf the hook assembly allowing catch and release.

Described is a torsion spring assisted fishing assembly consisting of two shafts ending with a single hook, treble hook, or jig hook and connected by a torsion spring. The shafts are bent 15 to 30 degrees upward behind the torsion spring to allow for closer configuration of shafts when in the closed position. The torsion spring holds the shafts apart in the open position. The assembly is placed in the closed position by compressing the shafts together. The first shaft has a latch before the bend of the hook. A metal or plastic sleeve with a connecting point where the fishing line is connected is placed on the second shaft. In the closed position the sleeve is slid onto the latch holding the shafts together. A slip ring or butt ring is placed in the torsion spring to keep the fishing line from tangling into the torsion spring. In the closed position a fish strikes the assembly or the fisherman pulls on the fishing line pulling the sleeve forward off the latch expanding the shafts which allows hooks to penetrate the interior of the mouth of the fish species.

A difficult part of fishing is the effective setting of hooks when a fish species bites. The delay or loss of time with this process can decrease the ability to catch a fish. If this is not done properly the fish species may be lost before being landed due to poor hook penetration.

2. Description of the Prior Art

This application relates to fishing hook assembles that contain self-setting hooks. In order to provide a self-setting hook, assembles have been provided with at least one hook but more commonly a pair of hooks movable under the influence of a spring to an open position in response to a fish striking the assembly.

Some self-setting hook assemblies engage in response to a fish species releasing a connecting latch such as: U.S. Pat. Nos. 456,776; 1,283,174; 2,856,722; 4,387,528; 4,476,646; 5,035,076; and U.S. Pat. Application 2004/0134118 A1.

Other hook assembly's spring open in response to a fish species pulling or the fisherman pulling on the fishing line such as: U.S. Pat. Nos. 44,368; 51,651; 712,497; 2,209,300; 2,223,946; 2,608,786; 2,746,199; 2,982,047; 3,241,260; 3,986,289; 4,186,509; 4,387,528; 6,497,068 B1; and U.S. Pat. Application 2014/0283433 A1.

And others spring open in response to fish species moving a trigger to release a spring such as: U.S. Pat. Nos. 684,211; 1,381,003; 1,591,640; 4,726,142; 4,928,421; and 8,915,011 B1.

BRIEF SUMMARY OF THE INVENTION

The present invention hook assembly operates for its intended purpose even when the torsion spring is not engaged. Many of the past inventions have concealed hook ends to keep its weedless characteristics but will not hook the fish species if not engaged. By not enclosing the hook ends the present invention is allowed to have artificial or live bait placed on the hook ends.

The present invention provides improved, less complicated, and more reliable with direct contact to the fishing line and the release sleeve. Past inventions may cause premature engagement with live bait interaction, casting operations, and manipulation of the fish species on these less reliable and complicated releases. With direct contact with the release sleeve and the ability to position the release sleeve at different positions on the latch the sensitivity of the fishing hook assembly can be adjusted. The latch beveled end also gives adjustable resistance to the release sleeve to make it more reliable.

The present invention with offset shafts provide close proximity when compressed and have a smaller profile of the two shafts are compared to hook end dimension with a single hook profile advantage. This also reduces the hook end dimensions concealing the fishing hook better. Past inventions have large shaft dimensions as compared to the hook ends and give a large profile to these inventions.

The present inventions ability to have the release sleeve that moves along the second shaft when released and gives the fish hook assembly a non-symmetrical configuration allowing different alignments at hookset. This gives flexibility in hooking fish species with a hook assembly that adjusts to a preferred position in the fish's mouth. Past inventions have a ridged symmetrical configuration which limits the hooking ability.

This present invention operates regardless of the fishing assembly's orientation with the release sleeve directly connected to the fishing line. Past inventions that utilize a trigger system will not operate properly unless the trigger with one required orientation is engaged.

DETAILED DESCRIPTION OF THE INVENTION

Figure 1:
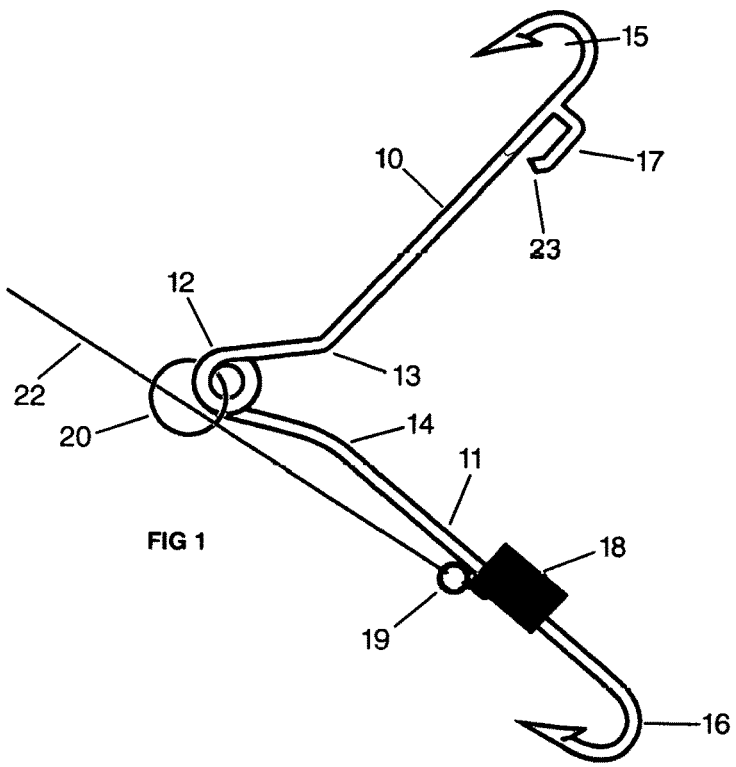
FIG. 1 is a side view of the hook assembly in the open position.
Figure 2:
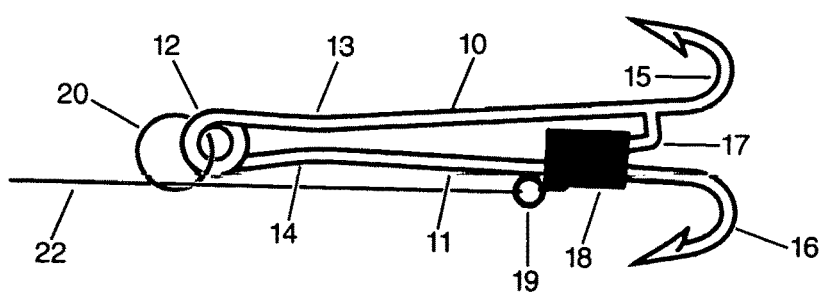
FIG. 2 is a side view of the hook assembly in the closed position.
Figure 3:
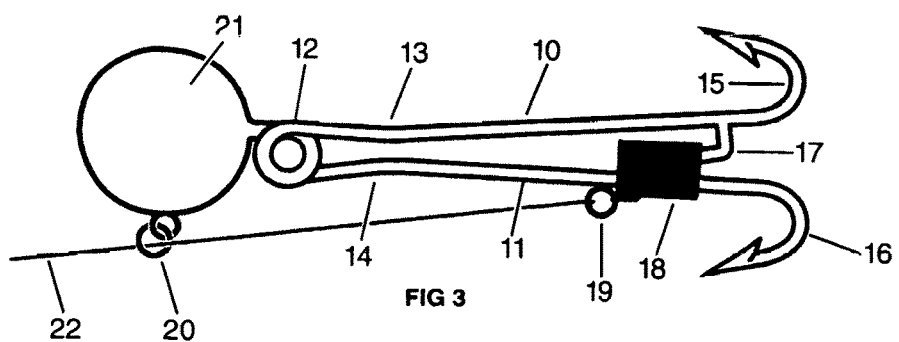
FIG. 3 is a side view of the hook assembly with a jig hook on the first shaft in the closed position.

The following description refers to figure FIG. 1, FIG. 2, and FIG. 3. FIG. 1 and FIG. 2 are shown in side views in the open and closed positions respectively, and FIG. 3 is shown in the side view in the closed position with a jig hook addition.

Components of the present invention are first shaft 10, second shaft 11, the torsion spring that connects the shafts 12, offset bend first shaft 13, offset bend second shaft 14, first shaft hook end 15, second shaft hook end 16, latch 17, release sleeve 18, release sleeve connector 19, slip for butt ring 20, jig head 21, fishing line 22, and latch bevel end 23.

Shafts 10 and 11 consist of a wire that when bent into a torsion spring 12 such that when the shafts are compressed into the closed position FIG. 2 will return into the open position. FIG. 1 if not retained.

Shafts 10 and 11 are offset 15 to 30 degrees with offset bend first shaft 13 and offset bend second shaft 14 in order to minimize the distance between the shafts when in the closed position FIG. 2 to reduce the profile of the fishing hook assembly.

The first shaft 10 consists of a latch 17 and a hook end 15 which can consist of a single hook FIGS. 1 and 2, treble hook, or jig hook FIG. 3. The latch 17 is located ahead of the bend of the selected hook.

The second shaft 11 has a hook end 16 which consists of a single hook. The release sleeve 18 is placed on the single hook end 11 with the release sleeve connector 19 pointed forward onto the point of the hook end 16 and rotated around the hook bend bringing it forward onto the second shaft 11.

Before the release sleeve 18 is placed on the hook end 16, the fishing line 22 is threaded through the slip or butt ring 20 and tied to the release sleeve connector 19 with a selected knot.

The release sleeve 18 is then installed as described in [024]. The first shaft 10 and second shaft 11 are compressed together and the release sleeve 18 is slid onto the latch 17. The latch bevel end 23 gives the resistance that will not allow premature release from fishing operations. Sliding the release sleeve 18 completely on the latch 17 will give the fish hook assembly the most resistance or placed as far forward on the latch 17 which will make it the most sensitive.

The fish hook assembly can have live or artificial bait can be placed on either or both hook ends 15 and/or 16. The hook ends 15 and 16 can be orientated from 180 degrees to 30 degrees from each hook end. In reducing the angle of the hook ends will reduce the profile of the hook assembly. FIGS. 1, 2, and 3 are all shown in orientation of 180 degrees from hook ends 15 and 16.

FIG. 3 shows the same fish hook assembly with a jig head addition 21. The jig head consists of a material that will provide weight or buoyancy to the fish hook assembly to allow either bottom contact or floating for the assembly.

The invention claimed is:

1. A fish hook assembly comprising:
a first shaft and second shaft connected at ends opposite hook ends of the fish hook assembly by a torsion spring;
a latch component located on the first shaft comprising a 90 degree bend terminating in an adjustable beveled end;
a release sleeve component positioned onto the second shaft engageable with said latch component;
a slip or butt ring;
wherein said first and second shafts are compressed together and held together with the release sleeve component slid onto the latch component configured with said latch end parallel to each shaft;
said beveled end locking the shafts together in a compressed position under tension; wherein the tension for disconnecting the release sleeve from the latch component is adjustable by said beveled end;
said release sleeve component operates as a triggering mechanism with a fishing line connected thereto and inserted through said slip or butt ring, which upon application of a tensioning force from the fishing line moves along second shaft towards said torsion spring off the latch component allowing said first shaft and second shaft to move in opposite directions rotating at the torsion spring into an expanded position without limitation to the extension of the torsion spring in the expanded position.

2. A fishing hook assembly according to claim 1, wherein the length of said release sleeve component defines the resistance of the triggering mechanism.

3. A fishing hook assembly according to claim 1, further comprising a weighted or floating jig head component connected to said first shaft positioned in front of said torsion spring opposite said hook end.

* * * * *